Figure 1:
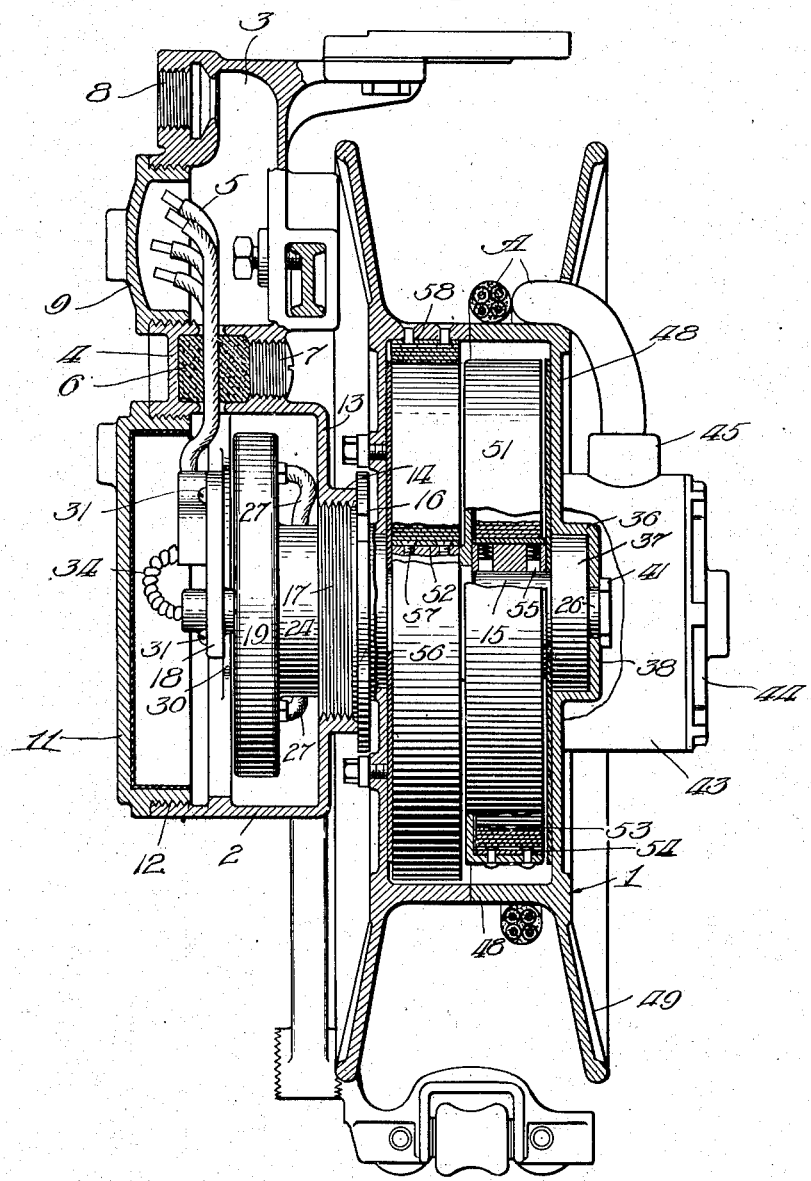

Patented Mar. 16, 1937

2,074,304

UNITED STATES PATENT OFFICE 2,074,304

LOCOMOTIVE STOKER

Charles J. Surdy, Tuckahoe, N. Y., assignor, by mesne assignments, to The Standard Stoker Company, Inc., New York, N. Y., a corporation of Delaware Application July 20, 1935, Serial No. 32,339

4 Claims. (Cl. 198—15)

My invention relates to locomotive stokers and more particularly to that class of stokers which transfer fuel from the bin on the tender to a firing opening extending above the level of the locomotive cab deck.

An important object of my invention resides in the provision of a novel and improved stoker which conveys the fuel therethrough with a minimum degradation in size and in which stoker the fuel delivery conduit is related with the locomotive in a manner to occupy but little space in the cab.

In accomplishing this end, and as a further object of my invention, I have constructed a stoker comprising a conveyor member flexibly supported on the locomotive and tender, said conveyor member including a trough portion underlying the fuel bin, an upwardly extending tubular portion rigid with said trough portion and at its forward end being flexibly related with a conveyor member on the locomotive, and a conveyor screw in each portion of said transfer conveyor member having separate drive connections.

As a further object, this invention contemplates the provision of a stoker as specified and wherein a conveyor screw is housed within the locomotive conveyor member and flexibly connected to the forward end of the conveyor screw within said tubular portion.

A still further object of this invention resides in the provision of a drive means for the conveyor screw in the tubular portion of the tender conveyor member so that the passage for fuel between the conveyor screws of the tender conveyor is free of any mechanism which would tend to pulverize the fuel, the said drive means including a shaft which is carried solely by the tender conveyor and operatively connects the rearward ends of the conveyor screws thereof.

Another object of my invention resides in providing the conveyor screw in the tubular portion of said tender conveyor member with a gear drive at its lower end, such gear drive being carried by the tender conveyor member.

A still further object of my invention is the provision of means intermediate the ends of said transfer conveyor member for additionally supporting the latter during its vertical, transverse and longitudinal movement with reference to the locomotive and tender.

Other objects and advantages of this invention consist in the novel relation of parts which will become apparent as the following description is read in connection with the accompanying drawing, wherein, Fig. 1 is a central vertical medial section of adjacent ends of a locomotive and tender with the invention embodied therein and shown in similar section;

Fig. 2 is a fragmentary view illustrating one modification of the invention shown in Fig. 1; and Fig. 3 is a view similar to Fig. 2, illustrating another modification of my invention.

Referring first to Fig. 1, the locomotive A includes a boiler 10 provided with a hollow backwall 11 at the rear of the firebox 12. In the backwall 11 is the firing opening 13 which is above the level of the cab deck 14 and the grates 15. Coupled to the locomotive at C is a tender B having a fuel bin 16 above the apertured floor 17.

The improved stoker for transferring fuel from the bin 16 to the firebox 12 is indicated generally at S and it includes the transfer conveyor member 18 having a trough portion 19 movably mounted by means of the rollers 20 beneath the fuel bin 16 to receive fuel therefrom. Within the trough portion 19 is a conveyor screw 21 driven from its rearward end by gearing 22 and extending forward of the tender. Immediately forward of the conveyor screw 21, the transfer conveyor member 18 is provided with a forwardly inclined tubular portion 23 having its lower wall 24 stepped downwardly at its rearward end and thence extending upwardly and forwardly to the locomotive.

Within the forwardly inclined tubular portion 23 is a conveyor screw 25, the rearmost fuel impelling flight 26 of which is spaced forward from the delivery end of the conveyor screw 21 and also offset axially therefrom in a downward direction. Between the trough portion 19 and the tubular portion 23, the transfer conveyor member is provided with a bearing 27 within which is journalled a shaft 28 provided at its forward and rearward ends with universal joints 29 and 30, respectively. The joint 29 connects the conveyor screw 25 in operative relation and is so disposed that it is not within the passage for fuel between the conveyor screws 21 and 25, thereby eliminating any fuel degradation at this point. The universal joint 30 operatively connects a shaft 31, driven by the gearing 22, with the journalled shaft 28 for transmitting power to operate the conveyor screw 25.

At its upper forward end, the tubular portion 23 is provided with a spherical shell 32 which is of said inclined portion, said last named screw having the rearmost impelling flight thereof spaced forward from and across the delivery end of the trough screw and offset axially therefrom in a downward direction, and a riser member on the locomotive connected to the forward end of said inclined portion and communicating with said firing opening, the screw in said inclined portion constituting the sole means for urging fuel through said riser member.

3. In a locomotive having a firebox and a backwall with a firing opening therein, and a tender for said locomotive having a fuel bin, a stoker for transferring fuel from the fuel bin to said locomotive firebox, comprising a transfer conveyor movably supported on the locomotive and tender, said transfer conveyor including a trough portion and an inclined portion, a conveyor screw in said trough portion and a conveyor screw in said inclined portion, said inclined portion being rigid with said trough portion and projecting forwardly at an incline to the trough portion forward of the screw thereof, and having the lower wall thereof stepped downwardly at its rear end and extending therefrom upwardly and forwardly, a bearing provided in the stepped portion between the trough portion and the inclined portion, means for operating each of said conveyor screws from their rearward ends including a shaft portion journalled in said bearing and being operatively connected to the screw of said inclined portion, said last named screw having the rearmost impelling flight thereof spaced forward from and across the delivery end of the trough screw and offset axially therefrom in a downward direction, a riser member on the locomotive connected to the forward end of said inclined portion and communicating with said firing opening, and a screw in said riser member flexibly connected to the screw in said inclined portion.

4. In a locomotive having a firebox and a backwall with a firing opening therein, and a tender for said locomotive having a fuel bin, a stoker for transferring fuel from the fuel bin to said locomotive firebox, comprising a transfer conveyor movably supported on the locomotive and tender, said transfer conveyor including a trough portion and an inclined portion, a conveyor screw in said trough portion and a conveyor screw in said inclined portion, said inclined portion being rigid with said trough portion and projecting forwardly at an incline to the trough portion forward of the screw thereof, and having the lower wall thereof stepped downwardly at its rear end and extending therefrom upwardly and forwardly, a bearing provided in the stepped portion between the trough portion and the inclined portion, means for operating each of said conveyor screws from their rearward ends including a shaft portion journalled in said bearing and being operatively connected to the screw of said inclined portion and gearing carried by said inclined portion operatively connecting said drive shaft with a source of power, said last named screw having the rearmost impelling flight thereof spaced forward from and across the delivery end of the trough screw and offset axially therefrom in a downward direction, and a riser member on the locomotive flexibly connected to the forward end of said inclined portion and communicating with the firing opening.

CHARLES J. SURDY.

March 16, 1937.   N. A. TORNBLOM   2,074,305
EXPLOSIONPROOF CABLE REEL
Filed Sept. 19, 1936   4 Sheets—Sheet 1

Inventor:
Nils A. Tornblom,
by Wm. F. Freudenreich,
Atty.